US011556635B2

(12) United States Patent
Keiter et al.

(10) Patent No.: US 11,556,635 B2
(45) Date of Patent: Jan. 17, 2023

(54) SYSTEM FOR EVALUATION AND WEIGHTING OF RESOURCE USAGE ACTIVITY

(71) Applicant: BANK OF AMERICA CORPORATION, Charlotte, NC (US)

(72) Inventors: Kelly Renee-Drop Keiter, Waxhaw, NC (US); Christopher Daniel Birch, Dayton, OH (US); Susan R. Hart, Addison, TX (US); Lisa Matthews, Charlotte, NC (US); Cody Dean Searl, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 225 days.

(21) Appl. No.: 16/860,900

(22) Filed: Apr. 28, 2020

(65) Prior Publication Data

US 2021/0334369 A1 Oct. 28, 2021

(51) Int. Cl.
*G06F 21/55* (2013.01)
*G06F 21/56* (2013.01)
*G06F 21/57* (2013.01)
*G06F 21/31* (2013.01)
*G06F 9/50* (2006.01)
*G06F 9/54* (2006.01)
*G06Q 30/02* (2012.01)

(52) U.S. Cl.
CPC .......... *G06F 21/554* (2013.01); *G06F 9/5011* (2013.01); *G06F 9/5083* (2013.01); *G06F 9/542* (2013.01); *G06F 21/31* (2013.01); *G06F 21/552* (2013.01); *G06F 21/566* (2013.01); *G06F 21/57* (2013.01); *G06Q 30/0207* (2013.01); *G06Q 30/0267* (2013.01); *G06F 2209/508* (2013.01)

(58) Field of Classification Search
CPC .... G06F 21/554; G06F 9/5011; G06F 9/5083; G06F 9/542; G06F 21/31; G06F 21/552; G06F 21/566
See application file for complete search history.

(56) References Cited

U.S. PATENT DOCUMENTS 6,714,944 B1 * 3/2004 Shapiro .................. G06F 16/24
7,412,412 B2 8/2008 Buxton et al.
(Continued)

OTHER PUBLICATIONS

Meshach et al. (Application of Geo-Location-Based Access Control in an Enterprise Environment, I. J. Computer Network and Information Security, 2018, 1, 36-43) (Year: 2018).*

*Primary Examiner* — Oleg Korsak
(74) *Attorney, Agent, or Firm* — Moore & Van Allen PLLC; Nicholas C. Russell

(57) ABSTRACT

Embodiments of the present invention provide systems and methods for evaluating and weighting resource usage activity data. The system may establish a communicable link to a user device via a user application to receive resource activity data and historical data from one or more users or systems via multiple communication channels. The system may evaluate the historical data and determine evaluation criteria based on perceived chance of loss associated with particular metadata characteristics, and use the evaluation criteria as weighted metrics for determining an overall evaluation score for the user based on indication from resource activity data that the user has conducted resource transfers with entities or channels identified in the historical data.

17 Claims, 4 Drawing Sheets

(56) References Cited

U.S. PATENT DOCUMENTS

| | | |
|---|---|---|
| 7,814,004 B2 | 10/2010 | Haggerty et al. |
| 7,814,008 B2 | 10/2010 | Choudhuri et al. |
| 7,831,494 B2 | 11/2010 | Sloan et al. |
| 7,873,566 B1 | 1/2011 | Templeton et al. |
| 7,905,396 B2 | 3/2011 | Tidwell et al. |
| 7,912,770 B2 | 3/2011 | Haggerty et al. |
| 7,991,690 B2 | 8/2011 | Choudhuri et al. |
| 8,297,501 B1 | 10/2012 | Kowalchyk et al. |
| 8,315,942 B2 | 11/2012 | Haggerty et al. |
| 8,438,105 B2 | 5/2013 | Haggerty et al. |
| 8,831,972 B2 | 9/2014 | Angell et al. |
| 9,253,203 B1 | 2/2016 | Ng |
| 9,294,498 B1 | 3/2016 | Yampolskiy et al. |
| 9,355,172 B2 | 5/2016 | Howes et al. |
| 9,367,694 B2 | 6/2016 | Eck et al. |
| 9,552,470 B2 | 1/2017 | Turgeman et al. |
| 9,930,061 B2 | 3/2018 | Zandani |
| 9,998,481 B2 | 6/2018 | Temm |
| 10,212,184 B2 | 2/2019 | Sweeney et al. |
| 10,491,619 B2 | 11/2019 | Yampolskiy et al. |
| 10,491,624 B2 | 11/2019 | Ng et al. |
| 10,505,953 B2 | 12/2019 | Cohen et al. |
| 11,023,896 B2 * | 6/2021 | Zhou ................ G06Q 20/40145 |
| 2005/0080716 A1 | 4/2005 | Belyi et al. |
| 2009/0089107 A1 | 4/2009 | Angell et al. |
| 2010/0250281 A1 * | 9/2010 | Gore ....................... G06Q 40/08 705/3 |
| 2011/0078073 A1 | 3/2011 | Annappindi |
| 2011/0265162 A1 * | 10/2011 | Alavandar ............. G06Q 99/00 726/7 |
| 2012/0290989 A1 * | 11/2012 | Li ....................... G06Q 10/0635 715/853 |
| 2015/0026039 A1 | 1/2015 | Annappindi |
| 2016/0080408 A1 | 3/2016 | Coleman et al. |
| 2016/0239831 A1 | 8/2016 | Saunders |
| 2016/0260102 A1 | 9/2016 | Nightengale et al. |
| 2017/0331828 A1 * | 11/2017 | Caldera ................ H04L 63/0807 |
| 2018/0025430 A1 | 1/2018 | Perl et al. |
| 2018/0176197 A1 * | 6/2018 | Matthews ........... H04L 63/0807 |
| 2018/0288073 A1 * | 10/2018 | Hopper ................ G06Q 20/401 |
| 2018/0352003 A1 * | 12/2018 | Winn ...................... H04L 63/10 |
| 2019/0108207 A1 * | 4/2019 | Upadhyay ............. H04L 51/046 |
| 2019/0251590 A1 | 8/2019 | Bodington |
| 2019/0349351 A1 * | 11/2019 | Verma ..................... G06F 21/46 |
| 2020/0210612 A1 * | 7/2020 | Saad ..................... G06F 3/0649 |
| 2021/0336993 A1 * | 10/2021 | Keiter ...................... H04L 63/20 |
| 2021/0342187 A1 * | 11/2021 | Hart ....................... G06F 9/5005 |

* cited by examiner

SYSTEM FOR EVALUATION AND WEIGHTING OF RESOURCE USAGE ACTIVITY

FIELD OF THE INVENTION

The present invention is generally related to systems and methods for providing convenient and reliable access to evaluation data.

BACKGROUND

With an increase in remote resource transfers and electronically automated resource activity, malfeasant activity may be increasingly hard to detect or predict. As such, there is a need for a system and methods of generating a weighted evaluation indicator that can be used to quickly and intuitively determine a confidence in future resource activity with a particular user or entity.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address present needs by providing a system for analysis and weighting of historical resource activity data to generate a confidence value. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel and store unique user patterns to form an authentication baseline for subsequent user communications. The system is further configured to switch between the various communication channels seamlessly, and in real-time. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for establishing a system for evaluation and weighting of resource activity data, the system comprising: at least one memory device with computer-readable program code stored thereon; at least one communication device; at least one processing device operatively coupled to the at least one memory device and the at least one communication device, wherein executing the computer-readable program code is configured to cause the at least one processing device to: establish a communicable link to a user device via a user application; receive a request from the user device to enroll a user in the system for evaluation and weighting of resource activity data; enroll the user in the system for evaluation and weighting of resource activity data, wherein enrolling the user comprises generating a user configuration to store resource activity data from the user; receive resource activity data from the user device; identify evaluation criteria for the resource activity data by detecting commonalities in metadata associated with the resource activity data and one or more historical data; and calculate an evaluation score for the user, wherein the evaluation score is generated by combining the evaluation criteria.

In some embodiments, enrolling the user further comprises requesting authorization from the user to access resource activity data from one or more third parties.

In some embodiments, historical data is received from one or more multiple communication channels, and further comprises data regarding recent events, anomalies, reported malfeasant activity, reported data breaches, and known vulnerabilities associated with particular merchants, resource channels, or resource accounts.

In some embodiments, evaluation criteria further comprises a weighted percentage value calculated based on potential or actual loss associated with one or more historical data.

In some embodiments, the system is further configured to determine reward eligibility based on the evaluation score for the user, wherein a higher evaluation score corresponds to a broader eligibility for rewards.

In some embodiments, the system is further configured to push an reward alert to the user via the user application, wherein the reward alert includes information indicating the user's evaluation score and reward eligibility.

In some embodiments, the system is further configured to generate a preemptive alert and push the alert to the user via the user application, wherein generating the preemptive alert comprises: receiving data from the user device or a third party indicating the user's geolocation corresponds to the geolocation of a merchant associated with relatively low evaluation criteria based on historical data; and generating a warning message that conducting a resource transfer with the merchant may incur a lower evaluation score for the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
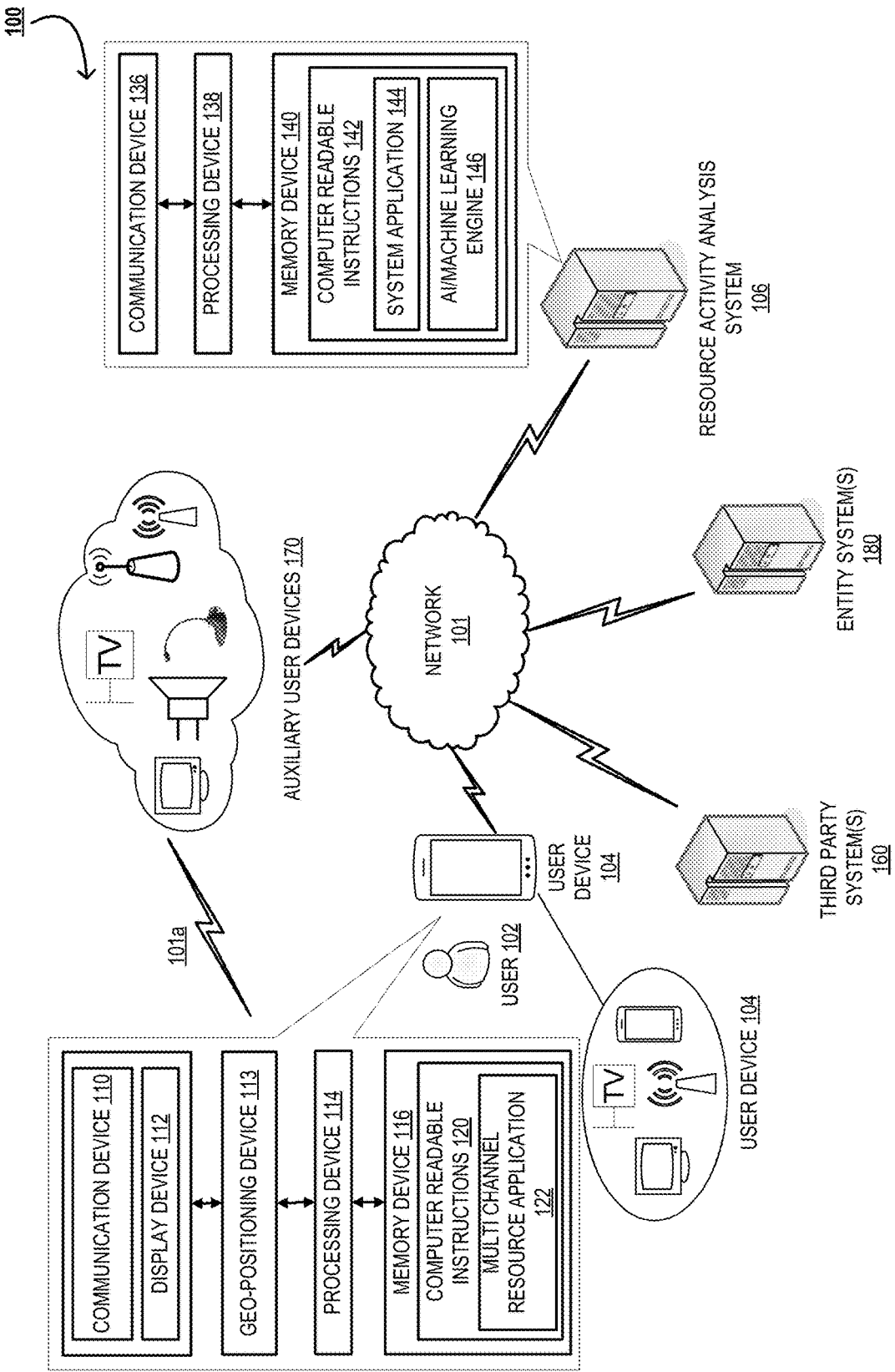
Figure 2:
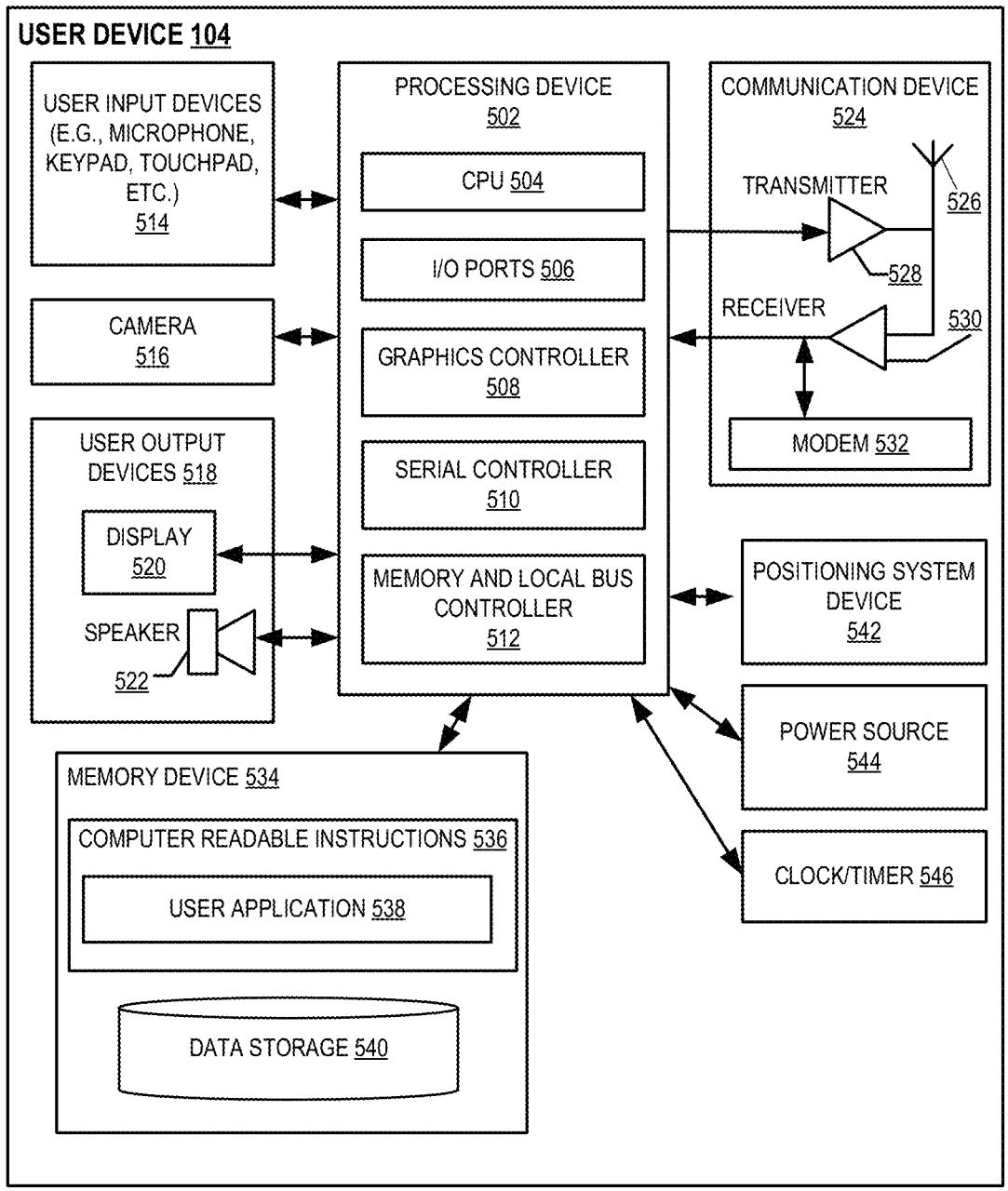
Figure 3:
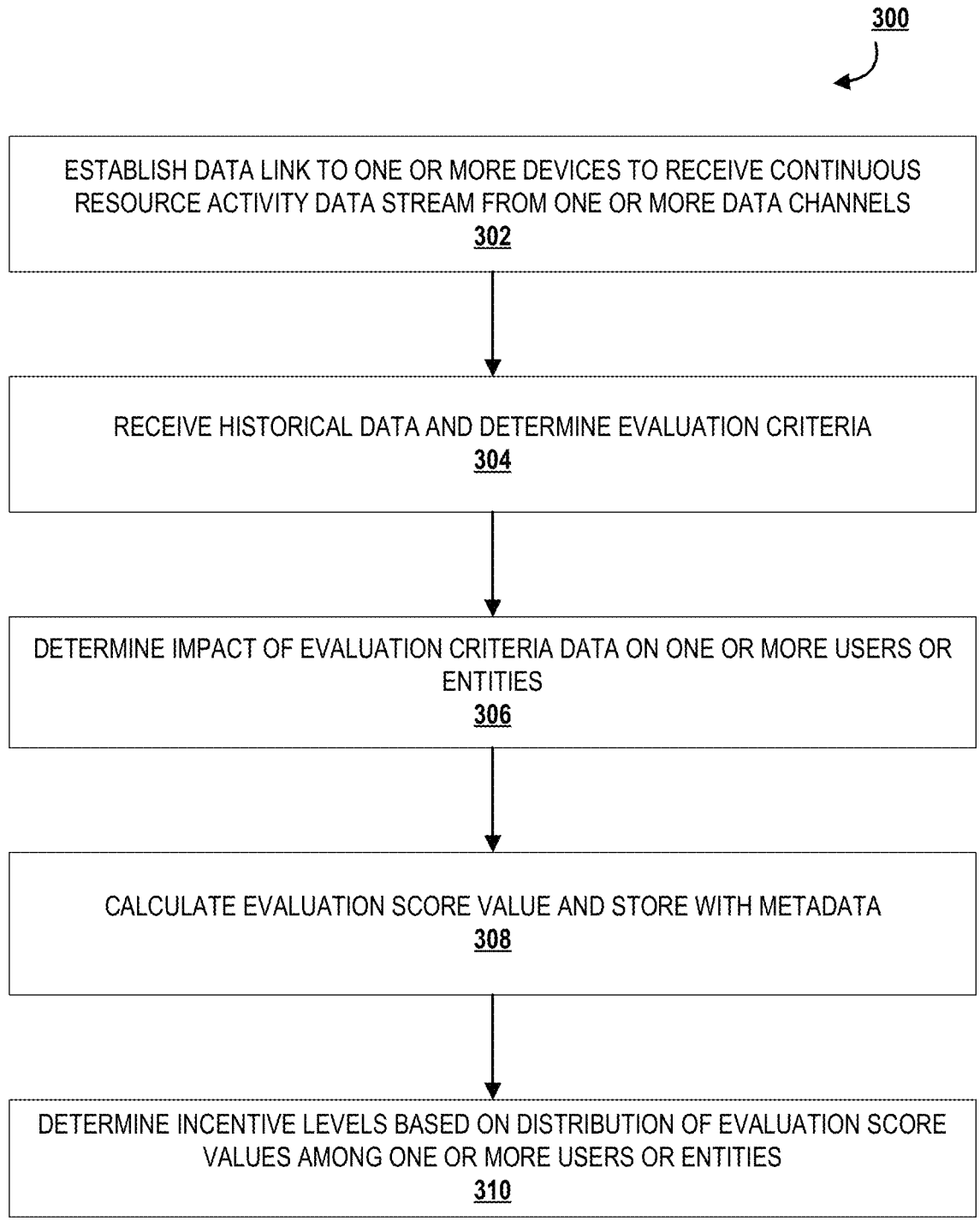
Figure 4:
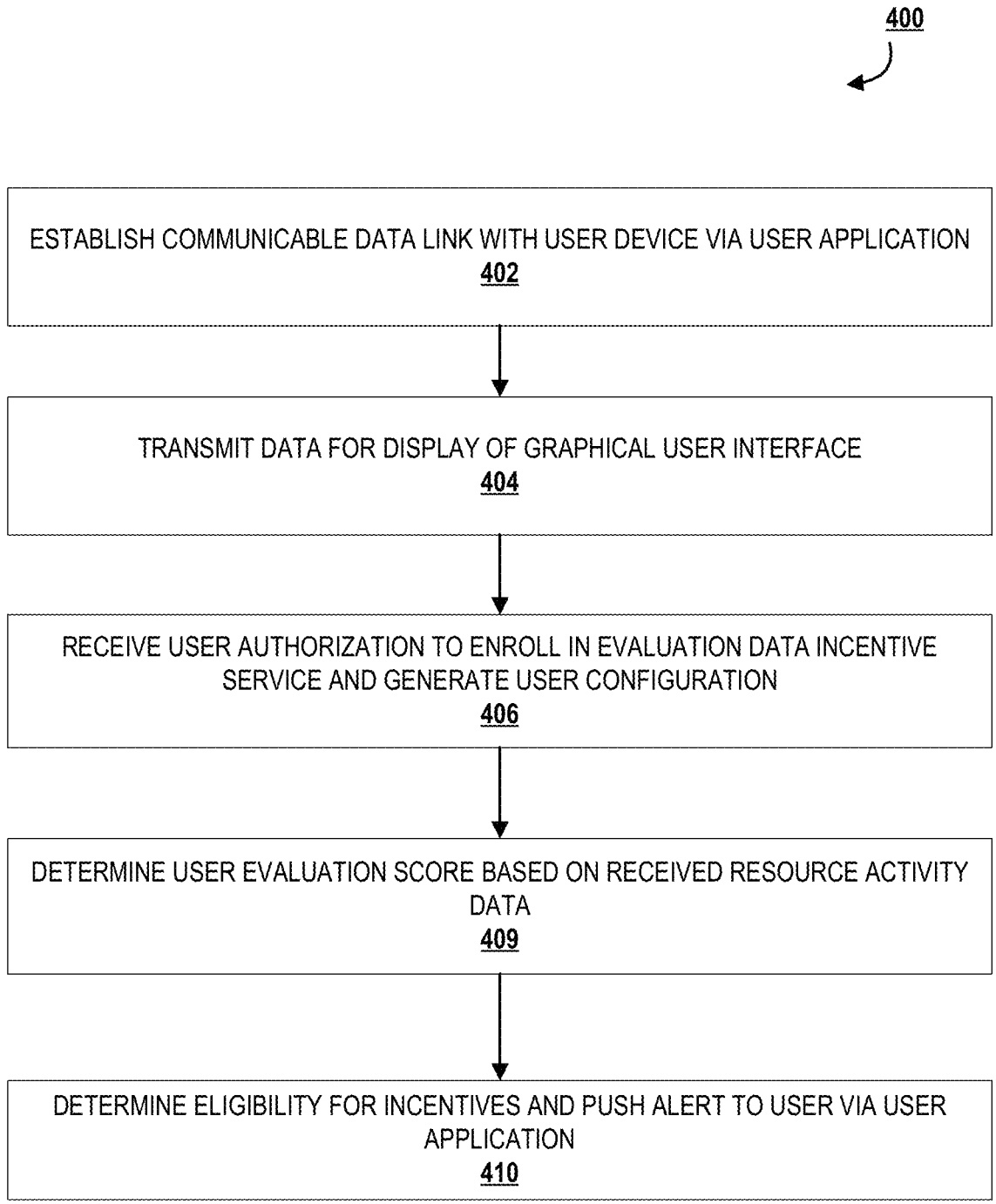

Having thus described embodiments of the invention in general terms, reference will now be made to the accompanying drawings, wherein:

FIG. 1 depicts a system environment 100 providing a system for multi-channel user input, in accordance with one embodiment of the present invention;

FIG. 2 provides a block diagram of the user device 104, in accordance with one embodiment of the present invention;

FIG. 3 depicts a high level process flow of resource activity analysis 300, in accordance with embodiments of the present invention; and FIG. 4 illustrates a high-level process flow 400 for interaction with one or more users to provide a resource activity evaluation interface, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like. As used herein, a "third party" or "third party system" may be an entity that does not manage the resource activity analysis system, but provides data to or receives data from the resource activity analysis system or entity system that controls the resource activity analysis system. It is understood that one or more third party systems and entities are contemplated as communicating with the resource activity analysis system over a network.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably.

An "account" may be established by the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user configuration that includes personal information associated with the user, or the like. The account may typically be associated with and/or maintained by an entity, or associated with technology infrastructure such that the account or resources stored in the account may be accessed, modified or acted upon by the user electronically, for example using or transaction terminals, user devices, merchant systems, and the like. In some embodiments, the entity may provide one or more technology instruments or financial instruments to the user for executing resource activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource activities like purchases, payments, returns, enrolling in merchant accounts and the like) or non-financial transactions (for resource activities associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "resource activity", may refer to any activities or communication between a user or entity and the financial institution, between the user and the entity, between the user and a third party (e.g., a transaction with a merchant), activities or communication between multiple entities, communication between technology applications or the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more rewards/coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, and the like). In some embodiments, the user may seek to perform one or more user activities using a multi-channel cognitive resource application of the invention, or user application, which is stored on a user device. In some embodiments, the user may perform a query by initiating a request for information from the entity using the user device to interface with the system.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

FIG. 1 depicts a platform environment 100 providing a system for analysis and evaluation of resource activity, in accordance with one embodiment of the present invention. As illustrated in FIG. 1, a resource activity analysis system 106, configured for providing an intelligent, proactive and responsive application or system, at a user device 104, which facilitates execution of electronic activities in an integrated manner, and which is capable of adapting to the user's natural communication and its various modes by allowing seamless switching between communication channels/mediums in real time or near real time. The resource activity analysis system is operatively coupled, via a network 101 to one or more user devices 104, auxiliary user devices 170, to entity systems 180, third party systems 160, and other external systems/third-party servers not illustrated herein. In this way, the resource activity analysis system 106 can send information to and receive information from multiple user devices 104 and auxiliary user devices 170 to provide an integrated platform with multi-channel cognitive data analysis capabilities to a user 102, and particularly to the user device 104. At least a portion of the system for analysis and evaluation of resource activity may be configured to reside on the user device 104 (for example, at the user application 122), on the resource activity analysis system 106 (for example, at the system application 144), and/or on other devices and system. Furthermore, the system for analysis and evaluation of resource activity is capable of seamlessly adapting to and switch between the user's natural communication and its various modes (such as speech or audio communication, textual communication in the user's preferred natural language, gestures and the like), and may be infinitely customizable by the system 106 and/or the user 102 to receive and analyze data records in any language.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary devices 170), as illustrated by communication channel 101a. Therefore, the system, via the network 101 may establish, operative connections between devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is an individual that wishes to request or submit data from the resource activity analysis system 106 using the user device 104. In some embodiments, the user 102 may access the resource activity analysis system 106, and/or the entity system 180 through a user interface comprising a webpage or a user application. Hereinafter, "user application" is used to refer to an application on the user device 104 of the user 102, a widget, a webpage accessed through a browser, or the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the resource activity analysis system 106. In some embodiments the user application 122 may refer to a third party application or a user application stored on a cloud used to access the resource activity analysis system 106 and/or the auxiliary user device 170 through the network 101, communicate with or receive and interpret signals from auxiliary user devices 170, and the like. In some embodiments, the user application is stored on the memory device 140 of the resource activity analysis system 106, and the user interface is presented on a display device of the user device 104, while in other embodiments, the user application is stored on the user device 104.

The user 102 may subsequently navigate through the interface or initiate one or more user activities or resource transfers using a central user interface provided by the user application 122 of the user device 104. In some embodiments, the user 102 may be routed to a particular destination or entity location using the user device 104. In some embodiments the auxiliary user device 170 requests and/or receives additional information from the resource activity analysis system 106/the resource entity system 160 and/or the user device 104 for authenticating the user and/or the user device, determining appropriate queues, executing information queries, and other functions. In other embodiments, the user application 122 may interface with one or more separate applications stored on the user device 104 such that it can receive and send data between applications in order to provide the user 102 with relevant information. For instance, the user 102 may utilize a web browsing application on the user device 104 to open a webpage in the user application 122 (e.g., the user wishes to access activity analysis evaluation results, and chooses to "open the webpage in" user application 122, or the like).

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate evaluation requests, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the resource entity system 160, the auxiliary user device 170 and the resource activity analysis system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate data analysis, data requests for evaluation information, or the like, and interact with or receive and decode signals from the auxiliary user devices 170, communicate with the resource activity analysis system 106 to request or transmit information. The user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the resource activity analysis system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the resource activity analysis system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the system application 144. Resource activity analysis system 106 also includes artificial intelligence (AI) and machine learning engine 146. In some embodiments, the AI and machine learning engine 146 is used to analyze received data in order to identify complex patterns and intelligently improve the efficiency and capability of the resource activity analysis system 106 to analyze received data and identify patterns. In some embodiments, the AI and machine learning engine 146 may included supervised learning techniques, unsupervised learning techniques, or a combination of multiple machine learning models that combine supervised and unsupervised learning techniques. In some embodiments, the machine learning engine may include an adversarial neural network that uses a process of encoding and decoding in order to adversarial train one or more machine learning models to identify relevant patterns in received data received from one or more channels of communication. In some embodiments, different ensembles of similar machine learning models with different training characteristics may be combined to achieve a desired result or accuracy in data processing.

FIG. 1 further illustrates one or more auxiliary user devices 170, in communication with the network 101. The auxiliary user devices 170 may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the user application 122, that may perform one or more user activities either alone or in conjunction with the resource activity analysis system 106, and specifically, the system application 144, one or more auxiliary user device 170, and the like in order to provide a system for adjustment of resource allocation or execution of user activities, resource activities, and the like based on multi-channel inputs.

The system for analysis and evaluation of resource activity, and the user application 122 in particular, are configured to function as an intelligent personal assistant and data navigator and are configured to perform one or more electronic user activities. In particular, the system is configured to present an integrated central user interface for communicating with the user via natural language or conversation channels, for requesting and transmitting authentication information, and for integrating the functionality of multiple applications in a single interface without requiring the user to access the multiple applications individually and be proficient in their operation. In addition, the system may store identification and authentication information for future use to expedite the completion of subsequent activities. In some instances, after initial authorization or authentication of a user during an initial activity, the system may authenticate the user by using alternate soft authentication techniques during the completion of subsequent activities (e.g., soft authentication may include requiring a passcode as opposed to three step verification in an original authentication during a single user "session" or on a single user device for a set period of time; the soft authentication may time-out based on a preset amount of time passing or the user exiting the application or logging out).

As such, the user application 122 is configured to perform one or more user activities in a convenient manner, via a central user interface of the application 122. In this regard, in some embodiments, the central user interface is presented on one or more user devices via the user application 122 or another user application 122. The central user interface associated with the user application 122 may be presented on the display device 112 of the user device 104 in response to receiving an indication from the user (for example, receiving a voice command from the user with an identifier, receiving a tactile indication or a fingerprint authentication from the user device 104, facial recognition information from the user device 104, and other authentication credentials, and the like), automatically in response to detecting an action trigger (for example, determining that the user is attempting to perform an activity by using a particular application or additional device, such as auxiliary user device 170, and the like). Additionally, the user application 122 may be configured to proactively alert the user of information analyzed and compiled by the resource activity analysis system 106 and entity systems 180. This information may include information related to other users that interact with the resource activity analysis system 106 if the resource transaction information is identified as being relevant and potentially useful to the user 102.

Typically, the central user interface is a computer human interface, and specifically a natural language/conversation user interface provided by the resource activity analysis system 106 to the user 102 via the user device 104 or auxiliary user device 170. The various user devices receive and transmit user input to the entity systems 180 and resource activity analysis system 106. The user device 104 and auxiliary user devices 170 may also be used for presenting information regarding resource activities, providing output to the user 102, and otherwise communicating with the user 102 in a natural language of the user 102, via suitable communication mediums such as audio, textual, and the like. The natural language of the user comprises linguistic variables such as words, phrases and clauses that are associated with the natural language of the user 102. The system is configured to receive, recognize and interpret these linguistic variables of the user input and perform user activities and resource activities accordingly. In this regard, the system is configured for natural language processing and computational linguistics. In many instances, the system is intuitive, and is configured to anticipate user requirements, data required for a particular activity and the like, and request data from the user 102 accordingly.

Also pictured in FIG. 1 are one or more third party systems 160, which are operatively connected to the resource activity analysis system 106 via network 101 in order to transmit data associated with user activities, user authentication, user verification, resource actions, and the like. For instance, the capabilities of the resource activity analysis system 106 may be leveraged in some embodiments by third party systems in order to authenticate user actions based on data provided by the third party systems 160, third party applications running on the user device 104 or auxiliary user devices 170, as analyzed and compared to data stored by the resource activity analysis system 106, such as data stored at entity systems 180. In some embodiments, the multi-channel data processing capabilities may be provided as a service by the resource activity analysis system 106 to the entity systems 180, third party systems 160, or additional systems and servers not pictured, through the use of an application programming interface ("API") designed to simplify the communication protocol for client-side requests for data or services from the resource activity analysis system 106. In this way, the capabilities offered by the present invention may be leveraged by multiple parties other than the those controlling the resource activity analysis system 106 or entity systems 180.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, and the like), a communication device or network interface device 524, a power source 544, a clock or other timer 546, a visual capture device such as a camera 516, a positioning system device 542, such as a geo-positioning system device like a GPS device, an accelerometer, and the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application 122. The multi-channel resource application 122 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a multi-channel resource application 122. In some embodiments, the multi-channel resource application 122 allows a user 102 to access and/or interact with other systems such as the entity system 180, third party system 160, or resource activity analysis system 106. In one embodiment, the user 102 is a maintaining entity of a resource activity analysis system 106, wherein the user application enables the user 102 to define policies and reconfigure the resource activity analysis system 106 or its components. In one embodiment, the user 102 is a customer of a financial entity and the multi-channel resource application 122 is an online banking application providing access to the entity system 180 wherein the user may interact with a resource account via a user interface of the multi-channel resource application 122, wherein the user interactions may be provided in a data stream as an input via multiple channels. In some embodiments, the user 102 may a customer of third party system 160 that requires the use or capabilities of the resource activity analysis system 106 for authorization or verification purposes.

The processing device 502 may be configured to use the communication device 524 to communicate with one or more other devices on a network 101 such as, but not limited to the entity system 180 and the resource activity analysis system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance, audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, it is understood that the system further includes one or more entity systems 180 which is connected to the user device 104 and the resource activity analysis system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device.

The entity system 180 comprises computer-readable instructions stored in the memory device, which in one embodiment includes the computer-readable instructions of an entity application. The entity system 180 may communicate with the user device 104 and the resource activity analysis system 106 to provide access to user accounts stored and maintained on the entity system 180. In some embodiments, the entity system 180 may communicate with the resource activity analysis system 106 during an interaction with a user 102 in real-time, wherein user interactions may be monitored and processed by the resource activity analysis system 106 in order to analyze interactions with the user 102 and reconfigure the machine learning model in response to changes in a received or monitored data stream. In one embodiment, the system is configured to receive data for decisioning, wherein the received data is processed and analyzed by the machine learning model to determine a conclusion.

FIG. 3 depicts a high level process flow of resource activity analysis 300, in accordance with embodiments of the present invention. The process 300 begins at block 302 wherein the resource activity analysis system 106 (the "system") establishes a communicable link with one or more devices to receive continuous resource activity usage data streamed from one or more data channels. In some embodiments, the resource activity usage data may comprise resource activity data such as transaction data regarding one or more transfers of resources between accounts, resource transfers for goods or services, and may be received from one or more user devices 104, third party systems 160, or entity systems 180. The resource activity usage data may contain metadata indicating resource amounts, resource accounts (e.g., routing numbers, account numbers, user information, or merchant identifiers for originating and receiving accounts, or the like), purpose of resource transfer, channel of resource transfer (e.g., NFC enabled chipless card authorization, debit card, credit card, paper check, tokenized account information transfer, electronic currency transfer, or the like) time, date, location, or the like.

Next, the system may receive historical data and determine evaluation criteria, or weighted evaluation metrics, for the received historical data, and to further begin categorizing the evaluation criteria data, as shown in block 304. The evaluation criteria may be a percentage score, either negative or positive, that indicates a confidence that potential loss will not occur, or in other words identify a probability of loss-correlated resource activity. As such, a higher positive evaluation criteria percentage will equate to a higher confidence in the veracity and relative low loss-correlated resource activities. Historical data may be received from any of the multiple data channels, devices, or systems discussed herein, and may include data regarding recent events, anomalies, reported malfeasant activity, reported data breaches, known vulnerabilities, or the like. In addition, the historical data may contain metadata identifying associated merchants, resource transfer channels, geolocations, websites, and the like that are linked to the historical data. Evaluation criteria can be generated by the system by ranking or scoring historical events associated with particular merchants, channels, and activities based on actual or potential losses associated with the historical events.

Depending on the relative size of the historical data pool, the ranking of evaluation criteria may differ; and as such, the system may continuously update the evaluation criteria as additional historical data is received. For instance, if a particular historical data point indicates a recorded resource loss associated with malfeasant activity that is greater than 90% of other historical data points, the evaluation criteria may weight any activity associated with associated entities (i.e., linked merchants, accounts, resource channels, or the like contained in the metadata of the historical data) as low. In other embodiments, evaluation criteria may be more heavily weighted based on frequency of historical data points. In other words, the actual or potential loss calculated for a single historical event may be small, but there may be a high frequency of historical events recorded which are associated with a single particular merchant, account, resource transfer channel, within a given timeframe or the like). In some embodiments, the system may leverage the use of artificial intelligence or machine learning engine analysis to discern patterns in historical data in order to identify new trends between historical data that otherwise would not appear to be related. If such trends are identified, the system may generate additional evaluation criteria based on these trends as well, appending any linked merchants, accounts, or resource transfer channels as being associated with the evaluation criteria. In some embodiments, evaluation criteria may be programmed to be purged or marked "dormant" after a set period of time passes since a particular historical event occurred, or since a trend has been identified. In this way, the system may automatically repair evaluation criteria for associated merchants, accounts, and resource channels over time if no new data indicates an ongoing potential for loss, while retaining the ability to "activate" the dormant data if a similar trend reappears.

Next, as shown in block 306, using the evaluation criteria, the system may determine the impact on one or more users or entities based on commonalities between the resource activity data received and the historical data and identified trends. In this way, the system analyzes the metadata of both the resource activity data and the historical data in order to determine which evaluation criteria are relevant. Next, as shown in block 308, the system may use the identified relevant evaluation criteria to calculate an evaluation score value for the user or entity, and store the evaluation score on the system. In some instances, the evaluation score may begin at 100% for all users or entities, and maybe averaged with relevant evaluation criteria in order to obtain a weighted evaluation score. In some embodiments, the evaluation score may not only be weighted by combination with the evaluation criteria itself, but the evaluation criteria may also be weighted appropriately based on the frequency of commonalities identified between the resource activity data and historical data. For instance, if the user submits resource activity data for two resource activities associated with a particular merchant identified in the historical data as being associated with high probability of loss-correlated activity, the relatively low evaluation criteria score may be averaged into the user's evaluation score twice, or the like. It is understood that any number of evaluation weighting structures may be employed, and this is just one simple representative embodiment to describe the basic process.

Finally, once a threshold level of users and entities have been given an evaluation score, the system may determine a distribution of evaluation scores and determine eligibility for reward levels, as shown in block 310. For instance, if a particular user has an evaluation score deemed to be in the highest $90^{th}$ percentile of all users or entities, the system may determine that the user has a low probability of loss-correlated resource activity, and may deem the user as being eligible for all available reward offers, lower rates, rebates, or the like in order to encourage the continuance of low-probability of loss-correlated resource activity. It is understood that any number of reward structures may be employed, and this is just one simple representative embodiment to describe the basic process.

FIG. 4 illustrates a high-level process flow 400 for interaction with one or more users to provide a resource activity evaluation interface, in accordance with embodiments of the present invention. As shown, the process begins at block 402, wherein the system establishes a communicable link with a user device via a user application. In some instances, the user device may have multiple user applications stored/installed on the user device 104 and the memory device 116 in particular. In some embodiments, the user application is a user application 122, also referred to as a "user application" 122 herein, provided by and stored on the user device 104 by the resource activity analysis system 106. In some embodiments the user application 122 may refer to a third party application or a user application stored on a cloud used to access the resource activity analysis system 106 and/or the auxiliary user device 170 through the network 101, communicate with or receive and interpret signals from auxiliary user devices 170, and the like. In some embodiments, the user application is stored on the memory device 140 of the resource activity analysis system 106, and the user interface is presented on a display device of the user device 104, while in other embodiments, the user application is stored on the user device 104.

The user 102 may subsequently navigate through the interface or initiate one or more user activities using a central user interface provided by the user application 122 of the user device 104. In some embodiments, the user 102 may be routed to a particular destination or webpage using the user device 104. In some embodiments the auxiliary user device 170 requests and/or receives additional information from the resource activity analysis system 106/the resource entity system 160 and/or the user device 104 for authenticating the user and/or the user device, determining appropriate queues, executing information queries, and other functions. In other embodiments, the user application 122 may interface with one or more separate applications stored on the user device 104 such that it can receive and send data between applications in order to provide the user 102 with relevant information. For instance, the user 102 may utilize a web browsing application on the user device 104 to open a webpage in the user application 122 (e.g., the user wishes to access activity analysis evaluation results, and chooses to "open the webpage in" user application 122, or the like).

Next, the system transmits data for display of a graphical user interface via the user application, as shown in block 404. The user application 122 stored on a user mobile device, is typically configured to launch, control, modify and operate applications stored on the mobile device. In this regard, the user application 122 facilitates the user 102 to perform a request for information from the resource activity analysis system 106, such as see their evaluation score. In some embodiments, the user application 122 is a mobile application managed by the entity systems 180 that the user interacts with in order to manage one or more existing resource accounts maintained by the entity systems 180, such as a "mobile banking application," or the like. In other embodiments, the user application 122 may be a standalone application that solely offers the functionality of providing data to the user, or the like. In further embodiments, the user application 122 may be a "voice assistant" or "mobile assistant" application geared toward the providing of a wide range of available information, with in-depth data verification only being one service provided by the assistant environment, or the like. In other embodiments, the user may submit a data request or submit resource activity data via one or more auxiliary devices 170, such as a smart home device, or the like, which can interface with the user application 122 stored on the user device 104, or may have a separate user application stored locally such that the smart home device may transmit and receive information directly from the resource activity analysis system 106.

Next, the system may receive user authorization to enroll in an evaluation data reward service (or other named service that allows the user to obtain an evaluation score based on submitted resource activity data), at which point a user configuration will be generated for the user and stored on the system containing information about the user (e.g., user name, user resource account details, user resource channels, user passwords, user preferences, and the like). During enrollment, the user may consent to automatic submission of resource activity data, or may authorize the system to communicate with third parties or other entity systems to obtain and analyze such resource activity data. In doing so, the system can determine a user evaluation score based on resource activity data received, as shown in block 409, and as more fully described with regard to FIG. 3.

Based on the user evaluation score for the user, the system may determine the user's eligibility for rewards and push alerts to the user of the identified rewards via the user application, as shown in block 410. In some embodiments, other alerts may be generated to help the user improve or maintain their evaluation score. For instance, the user may be presented with a transparent breakdown or summary breakdown of types of metrics used in calculating the evaluation score. In some instances, the full weighting structure used by the system may not be disclosed, but representative examples of types of resource activities that can lower the user's evaluation score may be given. In other embodiments, the system may list one or more particularly negative resource activities that has a high impact on the user's evaluation score and may include tips for avoiding similar resource actions in the future. For instance, the user may have conducted a resource transfer with an online merchant that does not use industry standard encryption or has been the subject of a recent data breach. In other instances, the user may have conducted a resource transfer with a merchant known to be involved with malfeasant resource transfers or flagged as violating anti-money laundering, know your customer, or other regulations. It is understood that the system may receive and request such data related to merchant and third parties from one or more entity systems described herein. In some embodiments, an entity managing the system for data verification may maintain an internal database of updated information related to users, merchants, third parties, and other entities. In other embodiments, the system may access one or remote data stores or databases that contain such information.

In some embodiments, the user application may be used to alert the user preemptively of potentially negative impacts of conducting a resource activity over a particular channel or with a particular merchant. For instance, the system may request and access geolocation data from the user device, and determine that the user is present at a brick and mortar location of a merchant known to be associated with high probability of loss-correlated resource activity, such as potential resource loss or recent data breach. In this instance, the user application may receive instructions from the system to present an alert to the user that conducting a resource activity at the merchant location may lower the user's evaluation score.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent application:

| U.S. patent application Ser. No. | Title | Filed On |
|---|---|---|
| 16/860,832 | SELECTIVE SECURITY REGULATION FOR NETWORK COMMUNICATION | Apr. 28, 2020 |

The invention claimed is:
1. A system for evaluation and weighting of resource activity data, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
      establish a communicable link to a user device via a user application;
      receive a request from the user device to enroll a user in the system for evaluation and weighting of resource activity data;
      enroll the user in the system for evaluation and weighting of resource activity data, wherein enrolling the user comprises generating a user configuration to store resource activity data from the user;

receive resource activity data from the user device;

identify evaluation criteria for the resource activity data by detecting commonalities in metadata associated with the resource activity data and one or more historical data;

calculate an evaluation score for the user, wherein the evaluation score is generated by combining the evaluation criteria;

append any data linked to the resource activity data such as merchants, accounts, or resource transfer channels to the evaluation criteria;

based on frequency of the appended data for multiple resource transfers, calculate a weighted evaluation criteria for a merchant;

receive data from the user device or a third party indicating a geolocation for user corresponds to a geolocation of the merchant associated with the weighted evaluation criteria;

generate a preemptive alert and push the alert to the user via the user application, wherein the preemptive alert comprises a warning message that conducting a resource transfer with the merchant may incur a lower evaluation score for the user;

verify that the user has conducted the resource transfer with the merchant;

generate a list of one or more evaluation criteria for the merchant in response to verifying that the user has conducted the resource transfer with the merchant and;

display the list of one or more evaluation criteria for the merchant, wherein the one or more evaluation criteria comprise one or more data points used by the system to generate a low evaluation score for the merchant.

2. The system of claim 1, wherein enrolling the user further comprises requesting authorization from the user to access resource activity data from one or more third parties.

3. The system of claim 1, wherein historical data is received from one or more multiple communication channels, and further comprises data regarding recent events, anomalies, reported malfeasant activity, reported data breaches, and known vulnerabilities associated with particular merchants, resource channels, or resource accounts.

4. The system of claim 1, wherein evaluation criteria further comprises a weighted percentage value calculated based on potential or actual loss associated with one or more historical data.

5. The system of claim 1, further configured to determine reward eligibility based on the evaluation score for the user, wherein a higher evaluation score corresponds to a broader eligibility for rewards.

6. The system of claim 5, further configured to push a reward alert to the user via the user application, wherein the reward alert includes information indicating the user's evaluation score and reward eligibility.

7. A computer program product for evaluation and weighting of resource activity data, the computer program product comprising a non-transitory computer-readable storage medium having computer-executable instructions to:

establish a communicable link to a user device via a user application;

receive a request from the user device to enroll a user in the system for evaluation and weighting of resource activity data;

enroll the user in the system for evaluation and weighting of resource activity data, wherein enrolling the user comprises generating a user configuration to store resource activity data from the user;

receive resource activity data from the user device;

identify evaluation criteria for the resource activity data by detecting commonalities in metadata associated with the resource activity data and one or more historical data;

calculate an evaluation score for the user, wherein the evaluation score is generated by combining the evaluation criteria;

append any data linked to the resource activity data such as merchants, accounts, or resource transfer channels to the evaluation criteria;

based on frequency of the appended data for multiple resource transfers, calculate a weighted evaluation criteria for a merchant;

receive data from the user device or a third party indicating a geolocation for user corresponds to a geolocation of the merchant associated with the weighted evaluation criteria;

generate a preemptive alert and push the alert to the user via the user application, wherein the preemptive alert comprises a warning message that conducting a resource transfer with the merchant may incur a lower evaluation score for the user;

verify that the user has conducted the resource transfer with the merchant;

generate a list of one or more evaluation criteria for the merchant in response to verifying that the user has conducted the resource transfer with the merchant; and display the list of one or more evaluation criteria for the merchant, wherein the one or more evaluation criteria comprise one or more data points used by the system to generate a low evaluation score for the merchant.

8. The computer program product of claim 7, wherein enrolling the user further comprises requesting authorization from the user to access resource activity data from one or more third parties.

9. The computer program product of claim 7, wherein historical data is received from one or more multiple communication channels, and further comprises data regarding recent events, anomalies, reported malfeasant activity, reported data breaches, and known vulnerabilities associated with particular merchants, resource channels, or resource accounts.

10. The computer program product of claim 7, wherein evaluation criteria further comprises a weighted percentage value calculated based on potential or actual loss associated with one or more historical data.

11. The computer program product of claim 7, further configured to determine reward eligibility based on the evaluation score for the user, wherein a higher evaluation score corresponds to a broader eligibility for rewards.

12. The computer program product of claim 11, further configured to push a reward alert to the user via the user application, wherein the reward alert includes information indicating the user's evaluation score and reward eligibility.

13. A computer implemented method for evaluation and weighting of resource activity data, the computer implemented method comprising:

establishing a communicable link to a user device via a user application;

receiving a request from the user device to enroll a user in the system for evaluation and weighting of resource activity data;

enrolling the user in the system for evaluation and weighting of resource activity data, wherein enrolling the user comprises generating a user configuration to store resource activity data from the user;

receiving resource activity data from the user device;

identifying evaluation criteria for the resource activity data by detecting commonalities in metadata associated with the resource activity data and one or more historical data;

calculating an evaluation score for the user, wherein the evaluation score is generated by combining the evaluation criteria;

appending any data linked to the resource activity data such as merchants, accounts, or resource transfer channels to the evaluation criteria;

based on frequency of the appended data for multiple resource transfers, calculating a weighted evaluation criteria for a merchant;

receiving data from the user device or a third party indicating a geolocation for user corresponds to a geolocation of the merchant associated with the weighted evaluation criteria;

generating a preemptive alert and push the alert to the user via the user application, wherein the preemptive alert comprises a warning message that conducting a resource transfer with the merchant may incur a lower evaluation score for the user;

verifying that the user has conducted the resource transfer with the merchant;

generating a list of one or more evaluation criteria for the merchant in response to verifying that the user has conducted the resource transfer with the merchant; and displaying the list of one or more evaluation criteria for the merchant, wherein the one or more evaluation criteria comprise one or more data points used by the system to generate a low evaluation score for the merchant.

14. The computer implemented method of claim 13, wherein enrolling the user further comprises requesting authorization from the user to access resource activity data from one or more third parties.

15. The computer implemented method of claim 13, wherein historical data is received from one or more multiple communication channels, and further comprises data regarding recent events, anomalies, reported malfeasant activity, reported data breaches, and known vulnerabilities associated with particular merchants, resource channels, or resource accounts.

16. The computer implemented method of claim 13, wherein evaluation criteria further comprises a weighted percentage value calculated based on potential or actual loss associated with one or more historical data.

17. The computer implemented method of claim 13, further configured to determine reward eligibility based on the evaluation score for the user, wherein a higher evaluation score corresponds to a broader eligibility for rewards.

* * * * *